United States Patent
Kassemi et al.

(10) Patent No.: US 11,562,350 B2
(45) Date of Patent: *Jan. 24, 2023

(54) SYSTEM AND METHOD FOR DUAL EMAIL AND WEB BASED CHECKOUT IN AN UNSEGMENTED LIST

(71) Applicant: SWOOP IP HOLDINGS LLC, Wilmington, DE (US)

(72) Inventors: James Kassemi, Albuquerque, NM (US); Nora Zulick, Albuquerque, NM (US)

(73) Assignee: SWOOP IP HOLDINGS LLC, Wilmington, DE (US)

( * ) Notice: Subject to any disclaimer, the term of this patent is extended or adjusted under 35 U.S.C. 154(b) by 75 days.

This patent is subject to a terminal disclaimer.

(21) Appl. No.: 17/107,000

(22) Filed: Nov. 30, 2020

(65) Prior Publication Data

US 2021/0110389 A1 Apr. 15, 2021

Related U.S. Application Data

(63) Continuation of application No. 14/627,868, filed on Feb. 20, 2015, now Pat. No. 10,853,799.

(Continued)

(51) Int. Cl.
*G06Q 20/38* (2012.01)
*G06Q 10/10* (2012.01)
*G06Q 20/40* (2012.01)

(52) U.S. Cl.
CPC ....... *G06Q 20/3821* (2013.01); *G06Q 10/107* (2013.01); *G06Q 20/40* (2013.01)

(58) Field of Classification Search
None
See application file for complete search history.

(56) References Cited

U.S. PATENT DOCUMENTS 6,101,485 A 8/2000 Fortenberry et al.
6,167,435 A * 12/2000 Druckenmiller .... G06F 16/9535
709/224

(Continued)

OTHER PUBLICATIONS

"Zero-Interaction Authentication", Mark D. Corner, mcorner@umich.edu, "Department of Electrical Engineering and Computer Science University of Michigan Ann Arbor, MI 48109-2122", pp. 2-3, MOBICOM'02, Sep. 23-28, 2002, Atlanta, Georgia, USA. Copyright 2002 ACM 1-58113-486-X/02/0009. (Year: 2002).

*Primary Examiner* — Christopher Bridges
*Assistant Examiner* — Tony P Kanaan
(74) *Attorney, Agent, or Firm* — Volpe Koenig

(57) ABSTRACT

A system and method for leveraging email to complete a checkout for registered and unregistered customers of the e-commerce system are disclosed. The system and method include receiving, by an email payment gateway, an email message comprising a customer email address and a token. The token includes transaction information for a transaction from a third party vendor. The system and method further include determining a registration status of a customer based on the customer email address, wherein the registration status is one of a registered customer of the e-commerce system or an unregistered customer of the e-commerce system. The system and method further include decoding the token and sending an email message to the customer email address based on the registration status and the decoded token.

20 Claims, 12 Drawing Sheets

Related U.S. Application Data

(60) Provisional application No. 61/942,383, filed on Feb. 20, 2014.

(56) References Cited

U.S. PATENT DOCUMENTS

| | | | |
|---|---|---|---|
| 6,175,823 B1 | 1/2001 | Van Dusen | |
| 8,566,243 B1* | 10/2013 | Bharathula | G06Q 30/04 |
| | | | 705/40 |
| 8,606,703 B1 | 12/2013 | Dorsey | |
| 8,725,635 B2 | 5/2014 | Klein et al. | |
| 8,762,272 B1 | 6/2014 | Cozens et al. | |
| 9,165,291 B1* | 10/2015 | Andersen | G06Q 20/10 |
| 9,760,871 B1 | 9/2017 | Pourfallah | |
| 9,967,242 B2* | 5/2018 | Parthasarathy | H04L 63/145 |
| 10,395,223 B2 | 8/2019 | Muthu et al. | |
| 10,515,345 B2 | 12/2019 | Koh et al. | |
| 10,853,799 B2* | 12/2020 | Kassemi | G06Q 20/3821 |
| 11,068,890 B2* | 7/2021 | Bacastow | G06Q 20/322 |
| 2005/0193075 A1 | 9/2005 | Haff | |
| 2005/0234802 A1 | 10/2005 | Zhang | |
| 2006/0161501 A1 | 7/2006 | Waserstein | |
| 2007/0022167 A1 | 1/2007 | Citron | |
| 2007/0073817 A1 | 3/2007 | Gorty | |
| 2008/0262920 A1 | 10/2008 | O'Neill | |
| 2009/0006233 A1 | 1/2009 | Chemtob | |
| 2009/0182637 A1 | 7/2009 | Roberts | |
| 2010/0070419 A1 | 3/2010 | Vadhri | |
| 2012/0030047 A1 | 2/2012 | Fuentes | |
| 2012/0124655 A1* | 5/2012 | Valin | G06Q 30/0278 |
| | | | 705/76 |
| 2012/0130898 A1 | 5/2012 | Snyder et al. | |
| 2012/0253897 A1* | 10/2012 | Killoran, Jr. | H04L 51/18 |
| | | | 705/14.4 |
| 2012/0310753 A1 | 12/2012 | Gaddis | |
| 2013/0346173 A1 | 12/2013 | Chandoor | |
| 2014/0025599 A1 | 1/2014 | Killoran | |
| 2014/0052617 A1 | 2/2014 | Chawla | |
| 2014/0289118 A1* | 9/2014 | Kassemi | G06Q 20/388 |
| | | | 705/44 |
| 2017/0270597 A1 | 9/2017 | Kassemi | |
| 2019/0287069 A1 | 9/2019 | Kassemi | |
| 2022/0012740 A1* | 1/2022 | Bacastow | G06Q 20/322 |

\* cited by examiner

FIGURE 5

System and Method for Dual Email and Web Based Checkout in an Unsegmented List

Token structure

Web Checkout For Unregistered Customer

System and Method for Dual Email and Web Based Checkout in an Unsegmented List

Web Checkout For Unregistered Customer

SYSTEM AND METHOD FOR DUAL EMAIL AND WEB BASED CHECKOUT IN AN UNSEGMENTED LIST

CROSS REFERENCE TO RELATED APPLICATIONS

This application is a continuation of U.S. patent application Ser. No. 14/627,868 filed Feb. 20, 2015, which claims the benefit of U.S. Provisional Application No. 61/942,383 filed Feb. 20, 2014 entitled SYSTEM AND METHOD FOR DUAL EMAIL AND WEB BASED CHECKOUT IN AN UNSEGMENTED LIST, which applications are incorporated by reference as if fully set forth.

FIELD OF INVENTION

This invention is related to electronic payment systems. More particularly, the invention is related to payment systems for completing a financial transaction utilizing email payment for registered and unregistered customers.

BACKGROUND

For many years, the tool for online payments was circumscribed. Customers located a product or service they wanted to purchase, and then entered their credit card information and delivery instructions to complete the transaction on web pages. Although there has been some development in this approach (such as PAYPAL), the basic format of using a uniform resource locator (URL) has gone unchanged. A customer may encounter merchandise and services in many different formats such as blogs, mobile apps, social media and email advertising, but the webpage is still the place a customer reaches to provide payment. Despite many innovations, customers still register for payment services and update account information through a URL. New technologies offering an alternative to visiting a URL checkout are desired to address this impediment.

Historically, customers have had only a limited selection of using PAYPAL or a credit/debit card when checking out online. Many of the disadvantages associated with these systems relate to their integration with mobile applications. Alternative payment systems that utilize other formats such as email are desired. As with any new technology that disrupts existing methods of payment, there remains the challenge of transitioning the customer base to the new process. Problems arise when customers are required to make unfamiliar choices. The unfamiliarity may deter the customer from adopting the new process. A system that does not present an "either or" option, as opposed to the migration or both options, for the customer may serve both the vendor and the customer by not forcing a choice of one or the other technology to be used. A system that offers the new email-based payment method identifies customers that may only checkout via a URL and drives them to the site while also registering them for email payments may be desired.

Vendors that adopt an email-based payment method may desire that customers that are not registered with the new payment method be directed to a URL allowing them check out quickly and efficiently using the least number of steps. However vendors, like people in general, are resistant to adopting new technologies, especially if that technology creates more work. Creating a system that integrates email-based check out with URL-based checkout while maintaining continuity between these two checkouts is desired.

When utilizing a mail-based financial transaction processing system, problems may arise that keep customers from completing the transaction. Although the percentage of problems may small, when scaled, the small percentage may impact a significant number of customers. Since using email-based payment methods may entail a similar registration process to web-based checkouts, integrating these solutions may be advantageous. If a vendor provides both email and web checkout paths, this may provide significant benefits to both the vendor and the customer by having a streamlined process.

A vendor with a multitude of offers may need a quick and easy way to generate different email paths for each offer. They may also need to generate an offer email with pay buttons. Generating the URL and email paths simultaneously with the goal to guide all customers into registered accounts may be welcomed in the market place. Many online vendors may also send email promotions to their customer base. This function may be separate from maintaining the website and the relationship to the payment processor. A system that could unify these functions by providing payment processing, unique URLs for each offer and an email with security keys may be welcome in the marketplace.

SUMMARY

Email-based financial transactions may use tokens that are included in a vendor's email solicitation. Vendors may send a single offer email from their own system to potential customers and have the e-commerce system handle both registered and unregistered customers in a smooth customer experience.

Vendors may leverage the e-commerce system to identify whether a customer is registered, and automatically direct an unregistered customer to a URL that captures the unregistered customer's information in order to acquire them as registered members of the e-commerce system. The URL checkout may be specific to the order attempted by the customer's initial selection. This allows the vendor to maintain separation from the e-commerce system and avoid segmenting their email list based on which customers are registered with the email e-commerce system and which are not, thereby reducing vendor workload and integration efforts. Vendors may be provided a single process to generate both an email token and a web checkout that may be used for their site, allowing for a more cohesive process for both the customer and vendor. To further improve the experience for both the customer and the vendor, a complete and automated capture of customer payment information may be provided while also registering customers for subsequent email transactions.

The present invention includes a system and method for leveraging email to complete a checkout for registered and unregistered customers of the e-commerce system. The system and method include receiving, by an email payment gateway, an email message comprising a customer email address and a token. The token includes transaction information for a transaction from a third party vendor. The system and method further include determining a registration status of a customer based on the customer email address, wherein the registration status is one of a registered customer of the e-commerce system or an unregistered customer of the e-commerce system. The system and method further include decoding the token and sending an email message to the customer email address based on the registration status and the decoded token.

BRIEF DESCRIPTION OF THE DRAWINGS

A more detailed understanding may be had from the following description, given by way of example in conjunction with the accompanying drawings wherein:

FIG. 5 illustrates an exemplary interface of the token generator for generating mailto links paired with webpage checkout URL addresses;

DETAILED DESCRIPTION

The embodiments described below may be used in tandem or in relation to specific vendor needs. They may also be integrated with an email service provider (ESP) or directly with a payment processor. Payment processing may occur in a number of ways using multiple gateways, credit cards, debit cards, direct carrier billing and/or an automatic clearing house. Although the description below focuses on the use of email messaging, social media networks may also be utilized. The configuration of the system may vary based on client needs. However, for the purposes of this application, FIG. 1 represents one possible configuration, and as such, it should not be viewed as limiting.

An email-based financial transaction may allow utilizing advertising emails to complete a sale by replying to an advertising email and selecting send. This may allow a transaction to be completed without leaving an email platform and driving the customer to a web URL, where they may need to register and checkout. In some cases, vendors may segment their email lists based on whether or not the recipients of the advertising emails are registered with the email-based technology. However, segmenting an email list may create extra steps and complicate the process. In some cases, segmentation and the management of lists may discourage vendors from adopting new payment methods based on email messages. Methods and apparatus described hereafter may eliminate the need to segment for the vendor. The system may recognize unregistered customers and automatically drive them to a URL registry to streamline the process for the vendor. This may also migrate unregistered customers into the new payment system. This method allows the customer to complete the payment but also register to use the email-based payment system provided by the email-based technology. This method provides the vendor options of checkout, including web-based URL checkout email checkout, and a methodology to migrate users from URL to email checkout.

Figure 1:
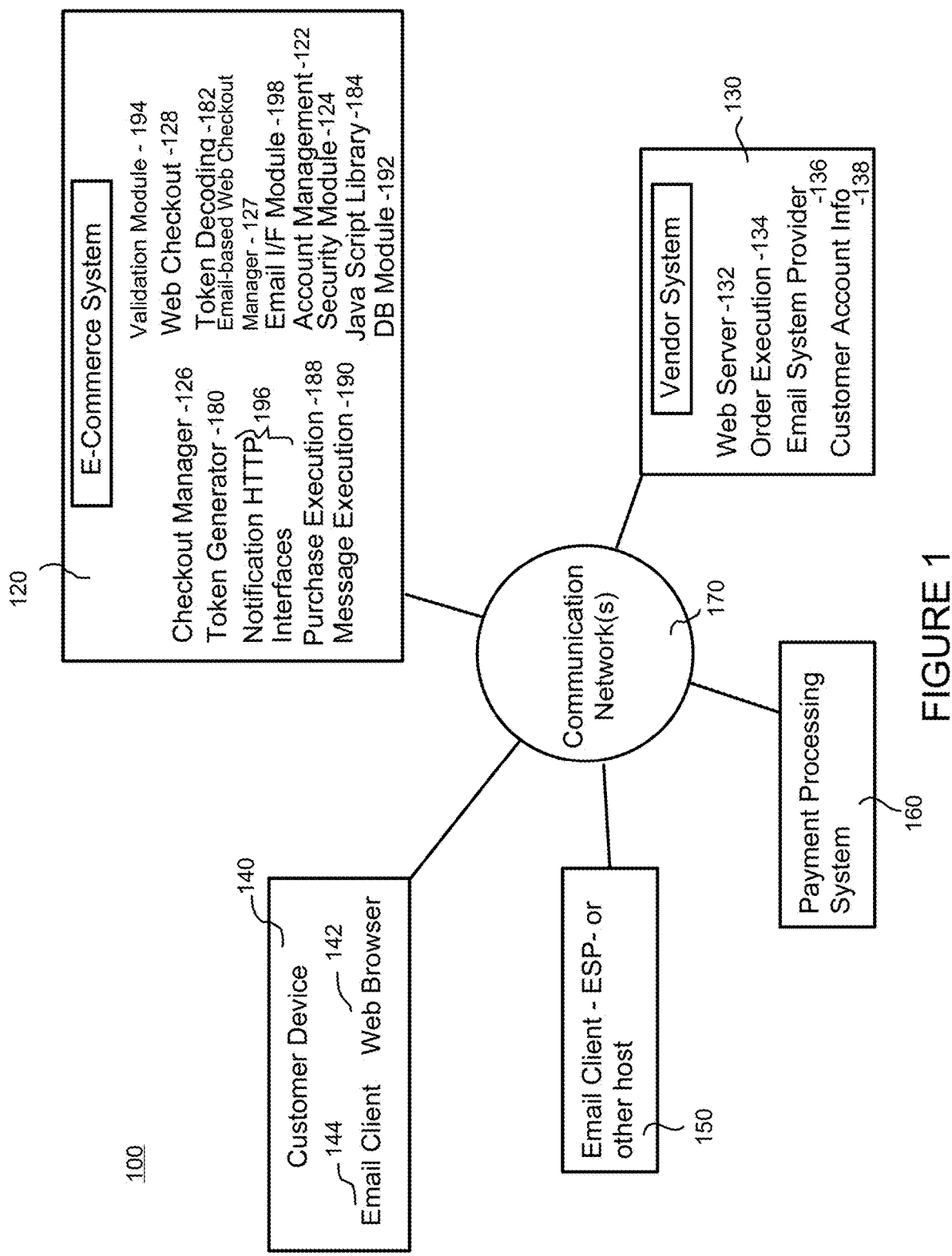
FIG. 1 illustrates a system diagram of an email-based system for dual email and web-based checkout utilizing an unsegmented member list.

FIG. 1 illustrates a system diagram of an email-based system 100 for dual email and web-based checkout in an unsegmented customer email list. The example system shown in FIG. 1 may be used for e-commerce transactions. The example system 100 includes a vendor system 130, an e-commerce system 120, a customer device 140, a banking server (not shown), an email service provider 150, and a payment processing system 160 that may communicate over one or more wired and/or wireless communication networks 170. The wired or wireless communication networks 170 may be public, private or a combination of public or private networks.

The customer device 140 may be, for example, a cellular phone, a smartphone, a desktop computer, a laptop computer, a tablet computer, or any other appropriate computing device. The customer device 140 includes a processor, memory, a web browser unit 142 that may communicate data to/from the web server module(s) in the vendor system 130 and e-commerce system 120 and an email client 144. The web browser unit 142 may include and/or communicate with one or more sub-modules that perform functionality such as rendering HTML (including but not limited to HTML5), rendering raster and/or vector graphics, executing JAVASCRIPT, and/or rendering multimedia content.

Alternatively or additionally, the web browser unit 142 may implement Rich Internet Application (RIA) and/or multimedia technologies such as ADOBE FLASH and/or other technologies compatible with Internet based communications. The web browser unit 142 may implement RIA and/or multimedia technologies using one or web browser plug-in modules (e.g., ADOBE FLASH), and/or using one or more sub-modules within the web browser unit 142 itself. The web browser unit 142 may display data on one or more display devices that are included in, or connected to, the customer device 140, such as a liquid crystal display (LCD) display or monitor. The customer device 140 may receive input from the customer of the customer device 140 from input devices (not depicted) that are included in, or connected to, the customer device 140, such as a keyboard, a mouse, a microphone or a touch screen, and provide data that indicates the input to the web browser unit 142.

The vendor system 130 may include a web server 132, an order execution unit 134, a processor (not shown), memory (not shown), a customer account information database 138, and an email system provider 136.

The web server 132 provides a website that may be accessed by a customer device 140. The web server 132 may implement the HTTP protocol, and may communicate Hypertext Markup Language (HTML) pages and related data from the website to/from the customer device 140 using HTTP. The vendor system 130 may be connected to one or more private or public networks (such as the Internet), via which the web server 132 communicates with devices such as the customer device 140. The web server 132 may generate one or more web pages and may communicate the web pages to the customer device 140, and may receive responsive information from the customer device 140.

The vendor system 130 may also include one or more additional components or modules (not depicted), such as one or more load balancers, firewall devices, routers, switches, and devices that handle power backup and data redundancy.

The order execution unit 134 is configured to receive instructions included in received messages and execute orders on behalf of the vendor system 130. The orders may be for purchasing of goods, making a donation or processing a financial transaction The memory (not shown) may be configured to store information associated with e-commerce transactions. This may include inventory information, information used to generate web pages, customer information, and other e-commerce data.

The email system provider 136 may access and manage the vendor system's 130 email.

The e-commerce system 120 may include a token generator 180, a purchase execution module 188, a message execution module 190, a validation module 194, a database module 192, a token decoder 182, a notification HTTP module 196, an email interface module 198, an account management unit 122, checkout manager 126, email-based web checkout manager 127, web checkout 128, JAVA script library 184, and a security module 124. While only one vendor system 130 is shown communicating with the e-commerce system 120, this is shown as an example only. The e-commerce system 120 may communicate with an internal or external email service provider (ESP) 150 and an internal or external payment processing system 160. The e-commerce system 120 may communicate with multiple vendor systems 130.

Similarly, vendors may register with the e-commerce system 120. The e-commerce system 120 may provide the vendor system 130 with a public key and private key to be used in token transaction in accordance with the methods described herein. When a transaction is attempted (e.g. for invoices and payments), the e-commerce system 120 decodes the token, authenticates the sender of the email, which may allow the transaction to be processed. While the e-commerce system 120 is depicted as a separate entity in FIG. 1, this is shown as an example only. The e-commerce system 120 may be controlled and/or co-located with the vendor system 130, and/or the email service provider 150.

The token generator 180 may generate tokens for use in e-commerce transactions. Tokens may be encrypted or plain text strings which contain information to perform a transaction when sent to the e-commerce system 120. A token may be one or multiple encrypted strings, files, passwords, cyphers, plain text or other data which may contain information used to perform or authenticate a transaction. While FIG. 1 shows the token generator 180 as being a part of the e-commerce system 120, it may be hosted by any trusted party with access to the private key. For example, the banking server may include a token generator 180. A token may include one or more of the following parameters or other parameters not listed below:

Private-key: The private key provided by the e-commerce system 120.

Public-key: E-commerce system's 120 public key, provided by the e-commerce system 120.

Auth-key: Any additional data that may be used to authenticate the transaction, including, but not limited to, biometric identification, location data and other fraud detection systems.

Partner-id: The partner ID given provided by the e-commerce system 120.

Environment: The environment the vendor wants to generate buttons for. This distinguishes whether the token is being used in a testing environment or in the live environment (and running real transactions).

Type: The type of token to generate (e.g. bulk, email-targeted, etc.). There are multiple types of tokens that a token generator may generate and decode. For example, site tokens may be used for website transactions, email tokens for minimum-of-clicks email payments, and universal tokens for email validations.

Card: The card token associated with the recipient of this token. When a customer is registered with the e-commerce system 120, the vendor receives a credit card token—a unique identifier that references the specific card associated with that customer and vendor. When the vendor is generating a token to submit to e-commerce system 120, they may include the card token as a customer identifier.

Email: The email associated with the receipt of this token.

URL: The Signup URL the recipient may go to if customer doesn't have payment information registered with e-commerce system 120.

Amount: The amount a customer should be charged for the transaction the token is generated for.

User-data: Data to pass back as a reference. This data may include custom data that the vendor may want to pass through the e-commerce system 120 and receive back when a transaction has completed. It may include an item reference number or SKU, customer address, or other piece of data that is not required by e-commerce system 120 to complete a transaction, but that the vendor wants associated with that transaction.

Expires: Expiration date for token, integer value of seconds since epoch.

Header-user-agent: The HTTP_USER_AGENT from the request header. HTTP headers are sent as part of a request from a customer's web browser unit within customer device 140 for a piece of information. These headers define the parameters that the web browser unit is expecting to get back. The user-agent is the identifier of the software that is submitting the request—typically the identifier of the web browser unit that is requesting the content.

Header-accept-language: The HTTP_ACCEPT_LANGUAGE from the request header. The accept-language is the acceptable language for the response—e.g. the language in which the web browser unit is requesting the content be sent back.

Header-accept-charset: The HTTP_ACCEPT_CHARSET from the request header. The accept-charset is the character sets that are acceptable for the response—e.g. the character set in which the web browser unit is requesting the content be sent back.

Ip-address: The IP address of the token recipient.

In one example, a bulk token may omit the card and email fields, thereby allowing for the tokens to be shared. Additionally, or alternatively, a bulk token may include the card field and/or email field but the e-commerce system 120 may be configured to ignore those fields and/or other fields based on the type field.

The purchase execution module 188 facilitates the execution of payments between a customer and a vendor.

The message execution module 190 is configured to analyze received messages and communicate with the token decoder 182 to determine if the received message is valid and to identify the request embedded in the message (e.g. request for purchase of goods.) If the token decoder 182 indicates the token is valid, the message execution module 190 may then access the account management unit 122 to verify a transaction.

The database module 192 serves as a database to store information that may be accessed by the e-commerce system 120.

The token decoder 182 may be configured to decode tokens received from external sources, such as a vendor system 130 or a customer device 140.

The validation module 194 may serve to authenticate received emails, using the DomainKeys Identified Mail (DKIM) and/or Sender Policy Framework (SPF) protocols. For example, SPF allows a domain owner to add a file or record on the server that the recipient server cross-checks. Similarly DKIM may be used to embed information within the email. While these specific validation/authentication protocols are discussed herein, any known validation/authentication protocol may be used and the use of the DKIM/SPF protocol is used only to enhance the understanding of the reader by using a specific possible validation/authentication protocol.

Generally, SPF is an email validation system designed to detect email spoofing by providing a mechanism to allow receiving mail exchangers to check that incoming mail from a domain is being sent from a host authorized by that domain's administrators. The list of authorized sending hosts for a domain may be published in the Domain Name System (DNS) records for that domain in the form of a specially formatted TXT record. Sender Policy Framework is described in IETF publication RFC 7208, which is incorporated by reference as if fully set forth.

The Simple Mail Transfer Protocol (SMTP) permits any computer to send an email claiming to be from any source address. SPF allows the owner of an Internet domain to specify which computers are authorized to send email with sender addresses in that domain, using Domain Name System (DNS) records. Receivers verifying the SPF information in TXT records may reject messages from unauthorized sources before receiving the body of the message.

The sender address is transmitted at the beginning of the SMTP dialog. If the server rejects the sender, the unauthorized client should receive a rejection message, and if that client was a relaying message transfer agent (MTA), a bounce message to the original sending address may be generated. If the server accepts the sender, and subsequently also accepts the recipients and the body of the message, it should insert a Return-Path field in the message header in order to save the sender address.

Generally, DKIM is an email validation system designed to detect email spoofing by providing a mechanism to allow receiving mail exchangers to check that incoming mail from a domain is authorized by that domain's administrators. A digital signature included with the message may be validated by the recipient using the signer's public key published in the DNS. DKIM is the result of merging DomainKeys and Identified Internet Mail. Prominent email service providers implementing DKIM include Yahoo, Gmail, AOL and FastMail. Any mail from these organizations should carry a DKIM signature.

More specifically, both, signing and verifying modules are usually part of a mail transfer agent (MTA). The signing organization may be a direct handler of the message, such as the author, the originating sending site or an intermediary along the transit path, or an indirect handler such as an independent service that provides assistance to a direct handler. In most cases, the signing module acts on behalf of the author organization or the originating service provider by inserting a DKIM-Signature: header field. The verifying module typically acts on behalf of the receiver organization.

DKIM is independent of Simple Mail Transfer Protocol (SMTP) routing aspects in that it operates on the RFC 5322 message—the transported mail's header and body—not the SMTP envelope defined in RFC 5321. Hence, the DKIM signature survives basic relaying across multiple MTAs. DKIM allows the signer to distinguish its legitimate mail stream. This ability to distinguish legitimate mail from potentially forged mail has benefits for recipients of e-mail as well as senders, and "DKIM awareness" is programmed into some e-mail software.

The "DKIM-Signature" header field, by way of example, may include a list of "tag=value" parts. Tags are short, usually only one or two letters. The most relevant ones are b for the actual digital signature of the contents (headers and body) of the mail message, bh for the body hash, d for the signing domain, and s for the selector. The default parameters for the authentication mechanism are to use SHA-256 as the cryptographic hash and RSA as the public key encryption scheme, and encode the encrypted hash using Base64. The receiving SMTP server uses the domain name and the selector to perform a DNS lookup. For example, given the signature:

DKIM-Signature: v=1; a=rsa-sha256; d=example.net;
   s=brisbane;
c=relaxed/simple; q=dns/txt; l=1234; t=1117574938;
   x=1118006938;
h=from:to:subject:date:keywords:keywords;
h=MTIzNDU2Nzg5MDEyMzQ1Njc4OTAxMjM0NTY-
   3ODkwMTI=;
b=dzdVyOfAKCdLXdJOc9G2q8LoXSlEniSbav+
   yuU4zGeeruD00lszZ VoG4ZHRNiYzR.

A verifier queries the TXT resource record type of brisbane._domainkey.example.net. The selector is a straightforward method to allow signers to add and remove keys whenever they wish—long lasting signatures for archival purposes are outside DKIM's scope. Some more tags are visible in the example:

v is the version,
a is the signing algorithm,
c is the canonicalization algorithm(s) for header and body,
q is the default query method,
l is the length of the canonicalized part of the body that has been signed,
t is the signature timestamp,
x is its expire time, and
h is the list of signed header fields, repeated for fields that occur multiple times.

The DKIM-Signature header field itself is always implicitly included in h.

The data returned from the verifier query is also a list of tag-value pairs. It includes the domain's public key, along with other key usage tokens and flags. The receiver may use this to then decrypt the hash value in the header field and at the same time recalculate the hash value for the mail message (headers and body) that was received. If the two values match, this cryptographically proves that the mail was signed by the indicated domain and has not been tampered with in transit.

Signature verification failure does not force rejection of the message. Instead, the precise reasons why the authenticity of the message may not be proven should be made available to downstream and upstream processes. Methods for doing so may include sending back a message, or adding an Authentication-Results header field to the message as described in RFC 7001, which is incorporated as if fully set forth.

While DKIM and SPF protocols are discussed herein, validation module 194 may perform any authentication and validation type protocols. DKIM and SPF are used to provide examples of such validation protocols that may be performed in validation module 194.

The notification HTTP module 196 delivers notices of events to external systems, such as an HTTP endpoint the vendor configures to update their internal database when a transaction is executed.

An email interface module 198 may be configured to parse emails for action by the e-commerce system 120.

The account management unit 122 is configured to manage accounts registered with the e-commerce system 120. A customer or vendor, wishing to complete a transaction with an e-commerce system 120 may register his/her email address and payment information with the e-commerce system 120. The account management unit 122 may be configured to store a customer registry and a vendor registry.

The security module 124 may be configured to perform additional security measures to prevent unauthorized access to the system or fraud.

The email service provider 150 may be associated with the vendor system 130, the e-commerce system 120, or may be a third party entity. The email service provider 150 may be configured to provide email marketing services. The email service provider 150 may further be configured to provide tracking information showing the status of email sent to each member of an address list. The email service provider 150 may further be configured to segment an address list into different interest groups or categories to send targeted information. The email service provider 150 may also parse messages based on the secondary system of email-targeted tokens. The email service provider 150 may also be configured to send trigger emails based on responses from the vendor system 130 or customer behavior. The email service provider 150 may further be configured to create or use templates generated by the e-commerce system 120. The templates may be used for sending information to contacts. Email service provider 150 may include a customer interface that allows a customer to adjust the template or it may be integrated with external sources (e.g. vendor system 130 or e-commerce system 120). The email service provider 150 may comprise a send engine (not shown), which allows vendors to distribute their message that may be received by one or more customer device(s) 140. The email service provider 150 may further include a tool for generating mailto links, graphic buttons, and tokens. The email service provider 150 may be configured to dynamically customize the content of emails that are sent out, to tailor personalized information and mailto links.

The banking server (not shown) may be controlled by a third party system bank. The e-commerce system 120 may communicate with the banking server to verify that the customer has adequate funds or credit for the requested payment. For example, the banking server may be a controlled by VISA, AMERICAN EXPRESS, MASTERCARD or any other banking or financial network that a customer may use for online payment. The banking server may be an automatic clearing house services (ACS). The banking server may be an interface for a centralized or decentralized virtual currency system or protocol such as frequent flyer miles, "reward" points, or Bitcoin.

The email-based e-commerce system 120 may allow vendors to send advertising emails or bills with a mailto link associated with a specific product offer (or payment amount) and select the mailto link and generate a response email by selecting the mailto link. This response email contains a token and is addressed to the e-commerce system 120. Once sent, this response email confirms the customer's payment for the product (or prepayment of a bill) by parsing the information in the token. The e-commerce system 120 processes the payment and notifies the vendor system 130 and the customer device 140. The e-commerce system 120 may comprise a token generator 180 as well as components for processing the tokens and components for processing the payments and a system for notifying the vendor system 130 of the transaction details.

The functionality of the offer, mailto link, and response email is described in U.S. patent application Ser. No. 14/324,807 filed Jul. 7, 2014 entitled EMAIL-BASED E-COMMERCE, which is a continuation of U.S. patent application Ser. No. 13/074,222 filed Mar. 29, 2011, which issued on Jul. 8, 2014 as U.S. Pat. No. 8,775,263 entitled SYSTEM AND METHOD FOR EMAIL-BASED E-COMMERCE, and U.S. patent application Ser. No. 13/074,235 filed Mar. 29, 2011 entitled EMAIL-BASED DONATIONS, which applications are incorporated by reference as if fully set forth.

Referring back to the example system in FIG. 1, the payment processing system 160 may be an independent third party operated unit, it may be located in the e-commerce system 120 or the vendor system 130.

While the example system shown in FIG. 1 shows the e-commerce system 120 comprising the token generator 180, this is shown as an example only. The vendor system 130 may also include a token generator that allows vendors to directly create tokens. In another example, a third party may have a token generator to create tokens for use by the vendor system 130.

System 100 may not require the vendor to host the token generator 180 on their system. System 100 uses the web browser's ability to transmit a message securely between two frames of a page and validating the URLs of those two pages.

Mailto links in the email messages may include one or any combination of the following fields: a "mailto:" and/or "to" field that indicate one or more email addresses of recipients of the new message; a "Copy To" or "CC" field that indicates one or more email addresses of recipients to whom a copy of the new message should be sent; a "Blind Copy To" or "BCC" field that indicates one or more email addresses of recipients to whom a "blind" copy of the new message should be sent; a field that indicates the subject of the new message; and a field that indicates the body of the new message. The mailto links may be defined according to the format described in Internet Engineering Task Force (IETF) RFC2368, which is incorporated by reference as if fully set forth herein.

The e-commerce system 120 may include a database of registered customers, such as for payment processing. The e-commerce system 120 may identify a customer by their email address and may decode tokens included in the content of an email and process payments based on the data in the token. A vendor that is associated with the e-commerce system 120 may send emails with the tokens generated for processing by the e-commerce system 120. When generating tokens, a related URL checkout page with a matching offer is generated. This allows vendors via vendor system 130 to send emails with payment options, including payments for product offers, donations, services and gift cards, for example, with each offer associated with a token and a URL checkout page. The token is associated with a mailto link. A customer may activate the mailto link by selecting (or "clicking on") the link and send the message to the e-commerce system 120. The e-commerce system 120 may then identify the email address and decode the token. If the e-commerce system 120 determines that the email address is not registered in the database, the e-commerce system 120 sends an email back to the customer with a URL link that is a checkout. This checkout is prepopulated based on the customer's mailto link selection based on the content of the token. The URL captures the payment information and registry information. The e-commerce system 120 updates the database once the new customer is registered. In future transactions, the email address of the customer is identified as registered by the e-commerce system 120 and the payment is processed exclusively through an email payment gateway.

An email-based e-commerce system 100, as described herein, allows an email payment opportunity. This may include an email advertisement offering a product or service which is sent to customers and contains the mailto links. Each mailto link may relate to an item (e.g. service or product). If the mailto link is selected by a customer, an email message associated with an item or items is generated. Within that generated email message is a token that includes encoded information such as the purchase amount, the merchant, or an item identifier. The information contained in the token includes details for both the completion of email transaction and details that provide context and direction for the process of completing a transaction when the details included within the token are not sufficient. This may include details about the composition of a page to collect more information from the customer (where the required fields and information about those fields are stored directly in the token), a pointer to a location where the composition of a page to collect more information is stored (where the required fields and information about these fields are indirectly referenced by data in this token for retrieval at a later time), or a pointer or description of a routine to execute in case of failures (e.g. a response email in the case of product unavailability). This mailto link may be generated by a vendor through a web interface tool, or by using the e-commerce system 100 to programmatically create either the token or the full mailto link.

For a customer to complete an email transaction, the customer's payment information may be contained in the email e-commerce system database 192. In order to determine if the customer's payment information is in database 192 the token may be decoded to recognize the customer when the email arrives at the e-commerce system 120. The vendor sends the first email via the vendor system 130. The customer via customer device 140 responds by activating a mailto link by sending the response to the e-commerce system 120. If the customer is registered and the incoming email is authenticated, when the token is decoded, the transaction is processed.

If the customer is not registered, a web checkout page may be needed. Additional information may be encoded within the email token that describes a web checkout page for the email offer. The vendor's email may thereby serve multiple purposes. One enables the email to perform as an email payment, if the customer is registered, and another enables the unregistered customer to be sent a web checkout 128. The web checkout 128 may be prepopulated with additional information based on the customers' original selection that is decoded from the token. The additional information included within the token identifies remote resources, which may include an input display and validation components. The remote resource may function as a plugin, as a reference to information stored in a database, or as a hook into the execution of an independent function.

When the web checkout 128 page is being loaded by the customer, the input display may provide the requirements for displaying the field on the form, including field name, entry box length, and other properties of the input field.

When the form has been filled out by the customer and is submitted, these form fields are sent to the validation resource to confirm that the information entered meets the formatting, length, data type, and any other requirements of the field. If validation resource returns a "pass" condition for the form, submission continues to the e-commerce system 120. If the validation resource returns a "fail" condition for any data on the form, error messaging may be displayed to the customer, to enable correction of the input and resubmission again.

These remote resources may be created to describe standard information that may be used across numerous merchants, or they may be used to define custom information that may be used for a single merchant.

Using this system 100, a vendor via vender system 130 may not be required to expend additional computer programming effort because it relies on the email e-commerce system 120. If the offer web page is linked to the email purchase opportunity, the vendor may not be required to modify any existing systems or processes to register customers with the email e-commerce system 120. The vendor may not need to segment their email lists into registered and unregistered customers and the customers are not aware of the distinction within the content of the email. The distinction between customers occurs by virtue of the system relieving both the vendor and the customer of any excess choices or distinctions. The vendor may create offers manually via a web interface, and the email e-commerce system 120 may handle the aspects of the transaction, from receiving the order request, facilitating the payment processing, storing relevant transaction data, sending a receipt, and displaying transaction data to the vendor.

The vendor may integrate directly with an API. The vendor may maintain existing payment flows separate from their email e-commerce solution, or the vendor may use the email e-commerce system as a full-featured payment system for both web and email transactions without doing any software development. Presenting the customer with a clear process that seamlessly migrates the customer to adopt an email-based checkout process eases the customer into a new technology where transactions happen by email instead of on a URL. This system 100 provides a vendor with a more automated or customized way of handling elements that may be achieved through the use of the email e-commerce system 120.

Although the present invention describes an e-commerce system that responds based on registered, unregistered or incomplete account information, the system could also respond based on other requirements. Responses such as service updates or change of location or the adjustments to orders are just a few examples.

Figure 2:
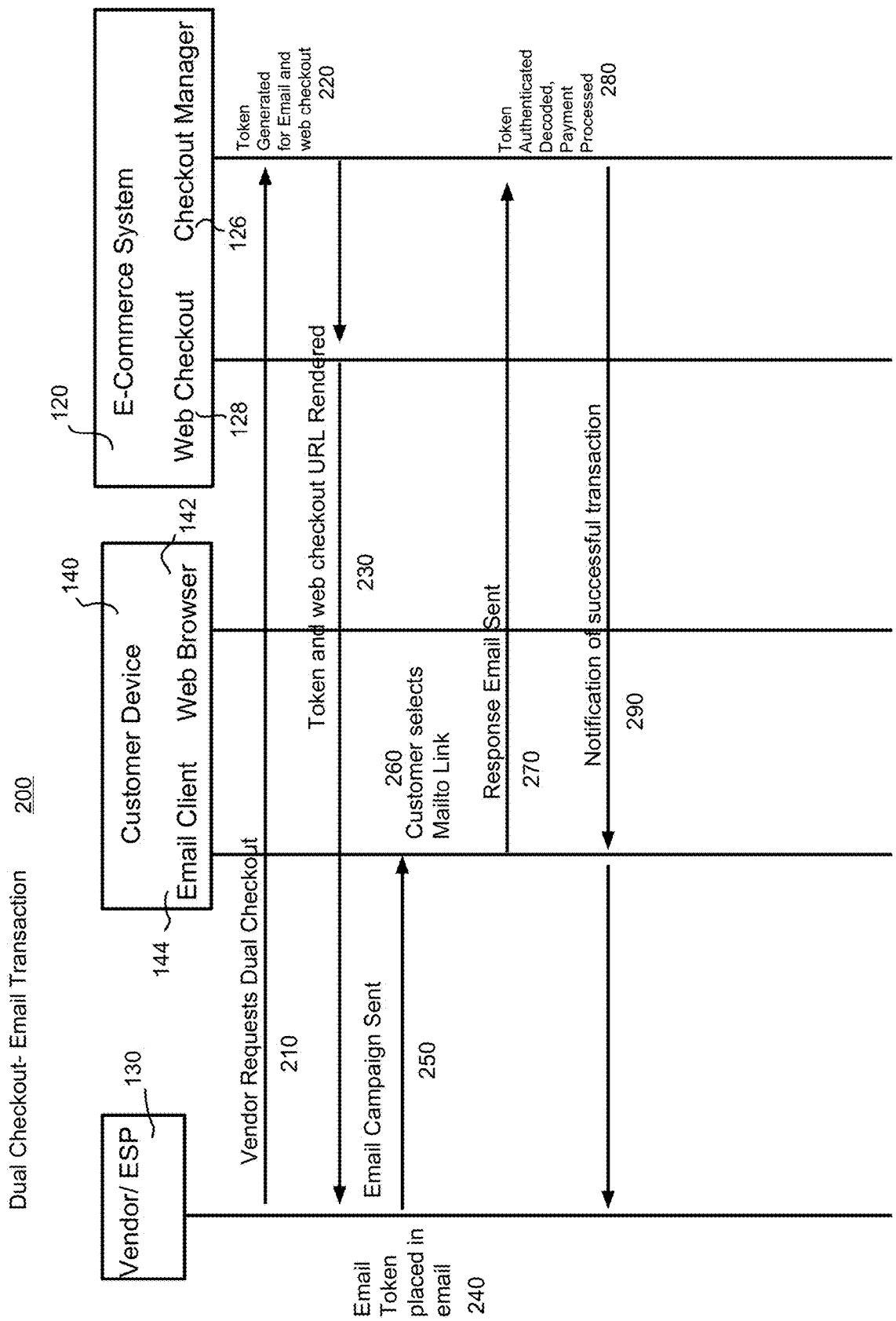
FIG. 2 illustrates an email transaction in a dual checkout scenario.

FIG. 2 illustrates an email transaction 200 in a dual checkout scenario. The email transaction 200 may be initiated by a vendor requesting dual checkout via vendor system 130 at step 210. The e-commerce system 120 may utilize checkout manager 126, web checkout 128 and token generator 180 to generate a token for sharing and web checkout at step 220. The e-commerce system 120 may share the token and web checkout URL to vendor system 130 at step 230. The vendor system 130 may place the token in an email at step 240. This email including the token may be sent at step 250 by the vendor system 130 to customers, who view it on their customer device 140. The customer via customer device's 140 email client 144 selects the mailto link at step 260. This selection causes a response email to be sent from the customer device 140 to the e-commerce system 120 at step 270. The e-commerce system 120 authenticates the email and decodes the token and the payment is processed at step 280. The transaction is completed when the e-commerce system 120 sends a notification of a successful transaction to customer device 140 and vendor system 130 at step 290.

Figure 3:
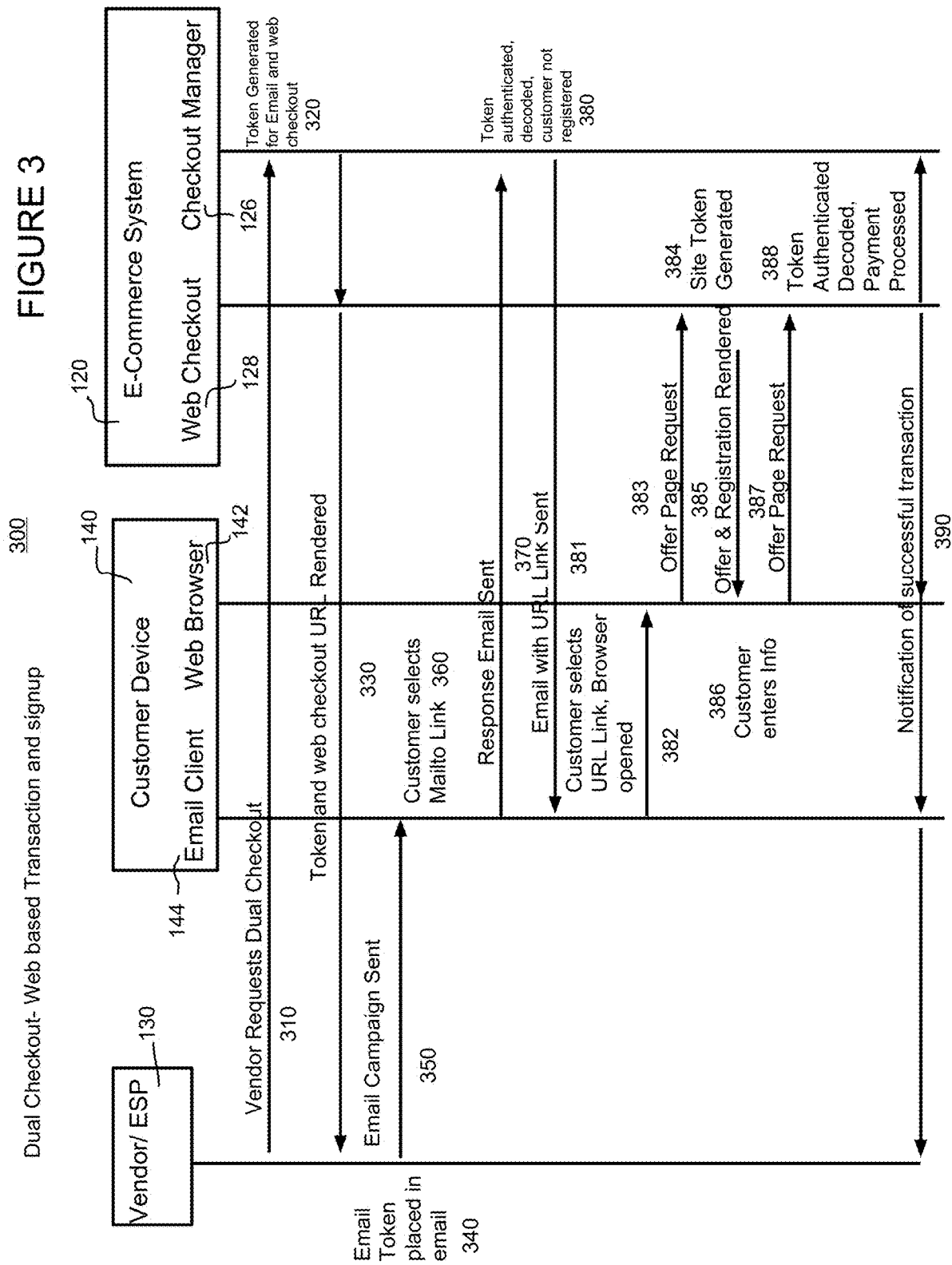
FIG. 3 is a flow diagram for unregistered members.

FIG. 3 illustrates a web-based transaction 300 in a dual checkout scenario. The web-based transaction 300 may be initiated by a vendor requesting dual checkout via vendor system 130 at step 310. The e-commerce system 120 may utilize checkout manager 126, web checkout 128 and token generator 180 to generate a token for sharing and web checkout at step 320. The e-commerce system 120 may share the token and web checkout URL to vendor system 130 at step 330. The vendor system 130 may place the token in an email at step 340. This email including the token may be sent at step 350 by the vendor system 130 to customers, who view it on their customer device 140. The customer via customer device's 140 email client 144 selects the mailto link at step 360. This selection causes a response email to be sent from the customer device 140 to the e-commerce system 120 at step 370. The e-commerce system 120 authenticates the email and decodes the token and the payment is processed at step 380. Since the customer is unregistered with e-commerce system 120, the e-commerce system 120 sends an email with the URL link to customer through customer device 140 at step 381. The customer accessing the email client 144 of customer device 140 selects the URL link to open a web browser 142 on customer device 140 at step 382. The customer via web browser 142 makes an offer page request at step 383. Responsive to the request, the e-commerce system 120 generates a site token at step 384. The e-commerce system renders an offer and registration to customer device 140 at step 385. The customer enters information at step 386 via web browser 142. The offer page request is returned to e-commerce system 120 at step 387. The e-commerce system 120 authenticates and decodes the token and processes the payment at step 388. The transaction is completed when the e-commerce system 120 sends a notification of a successful transaction to customer device 140 and vendor system 130 at step 390.

Figure 4:
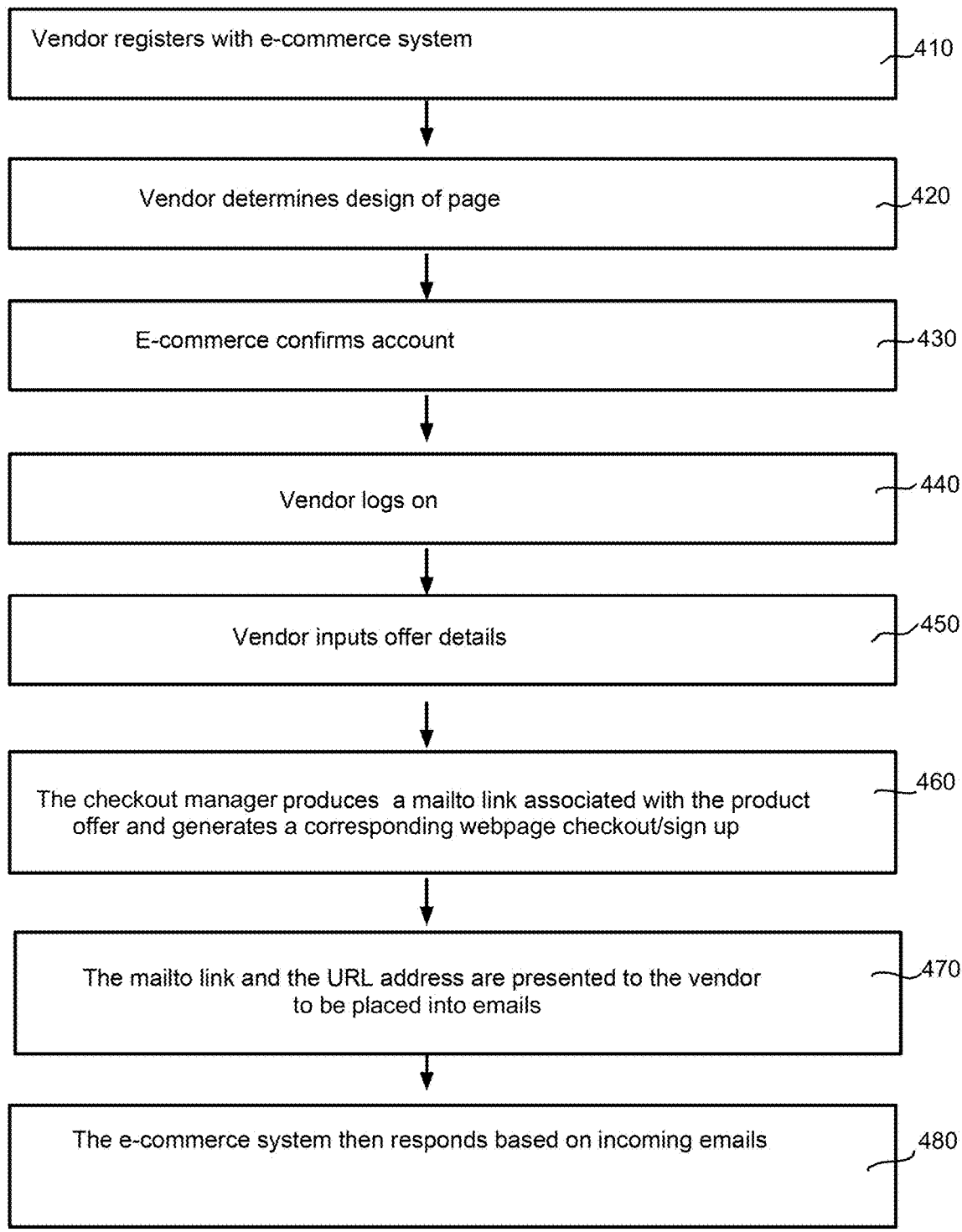
FIG. 4 illustrates a method allowing the vendor via vendor system to generate an email token and the web-based checkout in a single process within the e-commerce system of FIG. 1.

FIG. 4 illustrates a method 400 allowing the vendor via vendor system 130 to generate an email token and the web-based checkout in a single process within the e-commerce system 120. The email token and the web-based checkout share a record in the e-commerce system 120 allowing the vendor via the vendor system 130 to provide two versions of the same offer. The vendor system 130 may access a web-based tool or integrate directly using an API. Method 400 begins with the vendor registering with e-commerce system 120 via the vendor system 130 at step 410 by providing required information including a password, for example. The vendor via the vendor system 130 may determine the design of the webpage using offered templates of system 100 at step 420.

The e-commerce system 120 may confirm the vendor account and may run security checks at step 430. When the vendor needs to generate offer pages or email checkouts, the vendor via vendor system 130 logs onto system 100, optionally using a password or some other form of security check at step 440. The vendor via vendor system 130 may input offer details to submit at step 450.

The checkout manager 126 produces a mailto link associated with the product offer provided by the vendor at step 450 and generates a corresponding webpage checkout/sign up accessed via a URL address at step 460. The mailto link and the URL address are delivered to the vendor via vendor system 130 allowing the vendor to include the mailto link and the URL address into emails or other methods of delivery to customers at step 470. This description portrays the generation of a single offer and corresponding set of mailto link and URL address. For vendors that require multiple codes, the e-commerce system 120 integrates with the vendor system 130, such as through an existing inventory system, the vendor imports an excel spreadsheet or comparable file format to allow the e-commerce system 120 to generate a document with a series of corresponding email tokens and paired URL checkouts to thereby allow scaling.

At step 480, the e-commerce system 120 responds to incoming emails. When the incoming email with the email token is recognized, the transaction is processed using the mailto link process. If the incoming email with the email token is not recognized or the account information is not complete, the e-commerce system 120 sends an email including the URL address to the address from which the incoming email came. This sequence may vary based on vendor and customer needs, and the URL web checkouts may be used without the email-based functionality described. The token generator 180 may also produce bar codes, quick response (QR) codes or a code for near field communication (NFC) chips that may generate response emails. These various codes may originate as inventory codes and the e-commerce system 120 associates the offer with specific pre-existing inventory markers.

Figure 5:
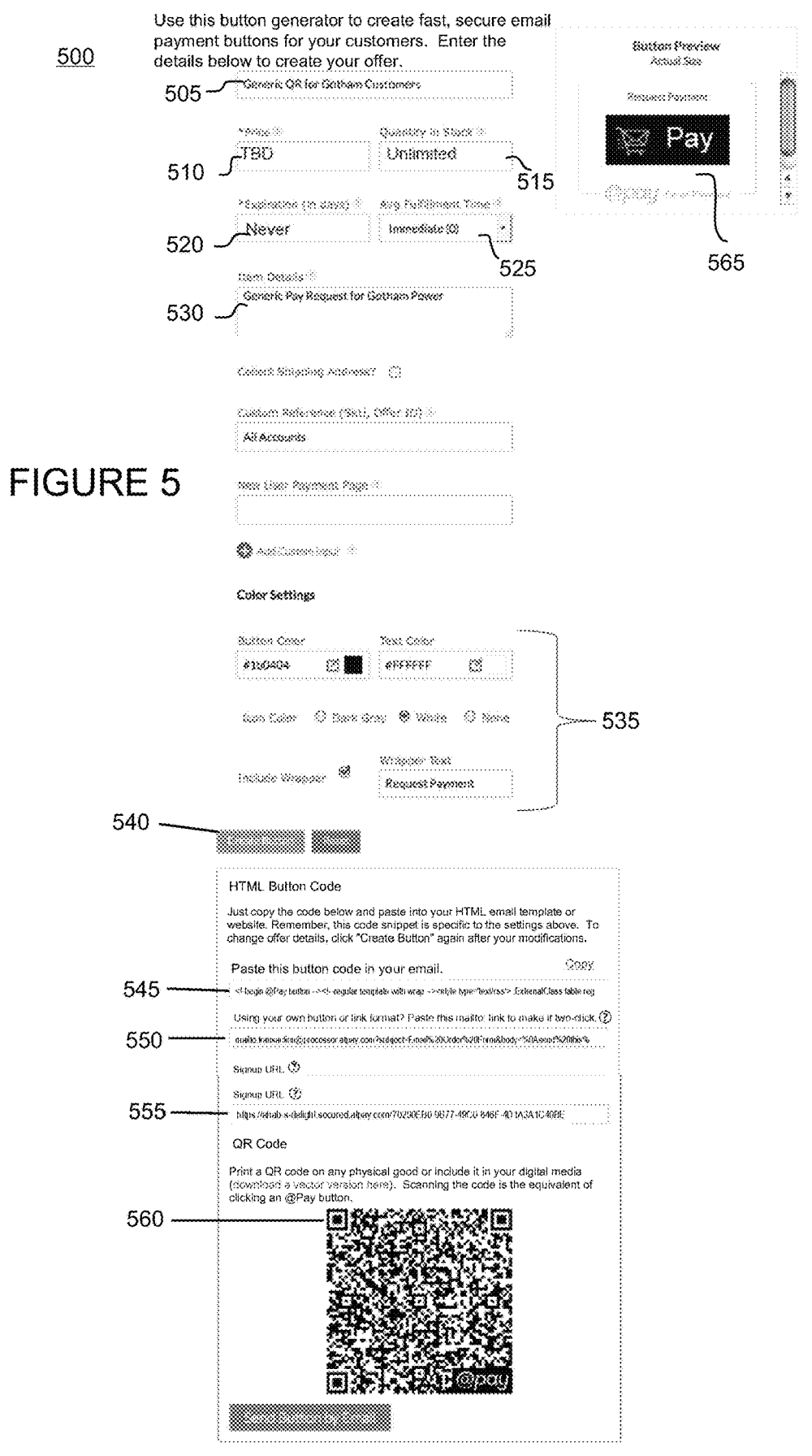

FIG. 5 illustrates an exemplary interface 500 of the token generator 180 for generating mailto links paired with webpage checkout URL addresses. Interface 500 includes input parameters for entering the item name 505, price 510, quantity 515, expiration of the token 520, fulfillment time 525, and item details 530. As shown, the name is generic QR for Gotham Power Customers, price is TBD with unlimited quantity that never expires.

Interface 500 may include the ability to control the display of the token in inputs 535. As shown, inputs 535 control button color, text color, icon color and wrapper text. A preview of the button is displayed in window 565. Once the inputs set appropriately, the create button 540 may be activated to create the token. The token generator 180 provides a token for pasting in an email 545, a token using special link format 550, a signup URL 555, a QR code 560, and an NFC (not shown) for use by the vendor via vendor system 130 in system 100 as described herein.

Figure 6:
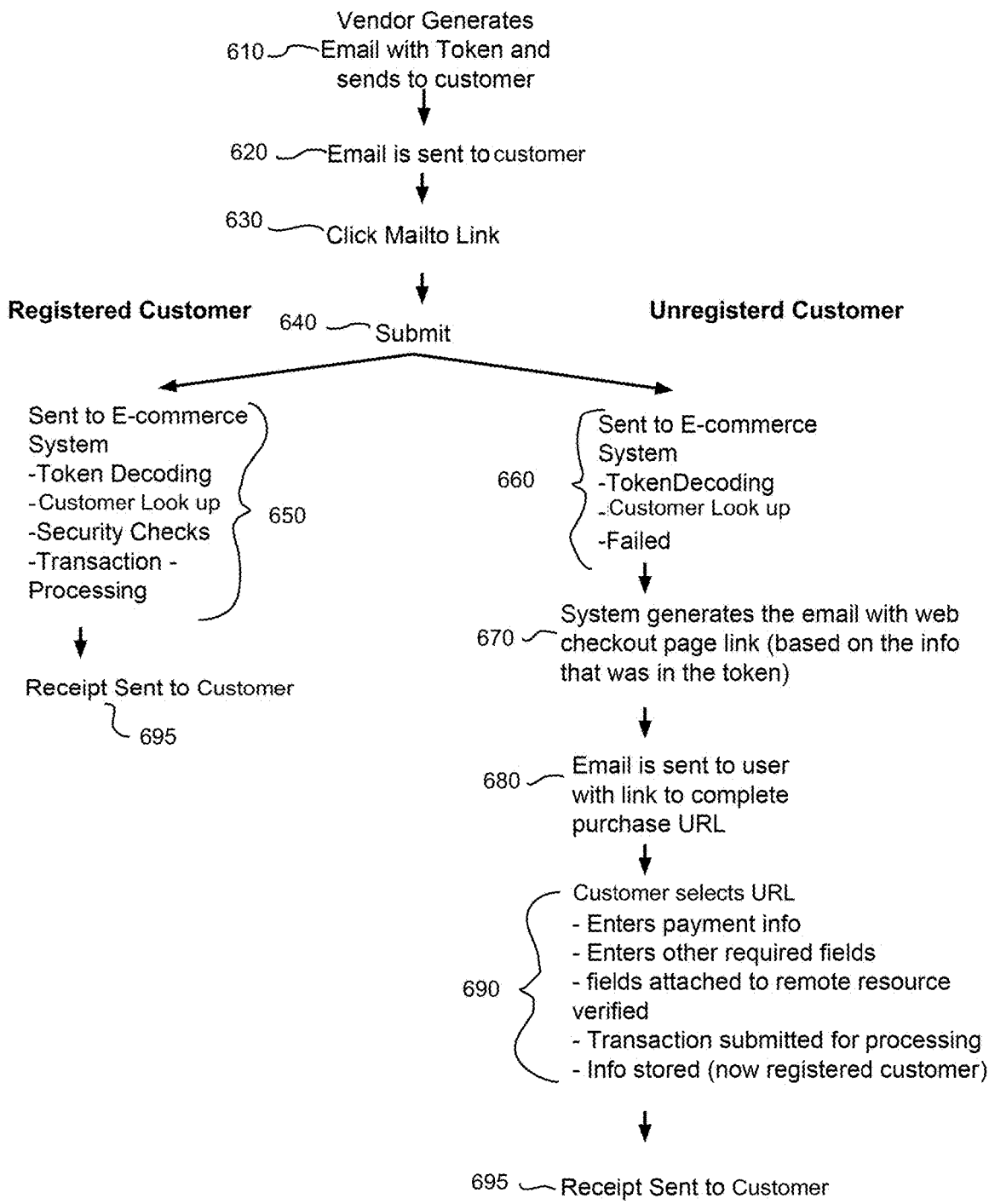
FIG. 6 illustrates a method for processing transactions for registered and unregistered customers.

FIG. 6 illustrates a method 600 for processing transactions for registered and unregistered customers. As shown in FIG. 6, a vendor via vendor system 130 generates an email with a token at step 610 and sends the email to a customer at step 620. The customer via customer device 140 may click the mailto link embedded in the email at step 630. This activation of the mailto link generates an email that is sent to the e-commerce system 120. Once this email is submitted, such as by being sent to the ecommerce system 120, for example, at step 640, the e-commerce system 120 determines whether the customer is a registered customer or an unregistered customer after decoding the token, performing customer lookup, and security checks, for example. If the customer is a registered customer of the e-commerce system 120 the e-commerce system 120 processes the transaction at step 650 and sends a receipt to the registered customer at step 695.

If the customer is an unregistered customer at step 660, the e-commerce system 120 generates an email with a hyperlink that provides a link to a web checkout page at step 670 where the link is based on the information contained in the token. This link is provided to the customer via email at step 680. The customer via customer device 140 may complete the web checkout at step 690, which also registers the customer within e-commerce system 120. The e-commerce system 120 may then send a receipt to the customer at step 695.

A customer who is registered with the e-commerce system 120, but whose account information is inaccurate or out-of-date may also receive a URL link in an email as if the customer is unregistered. This allows the customer to update their account information. The e-commerce system 120 may then send a receipt to the customer.

Figure 7:
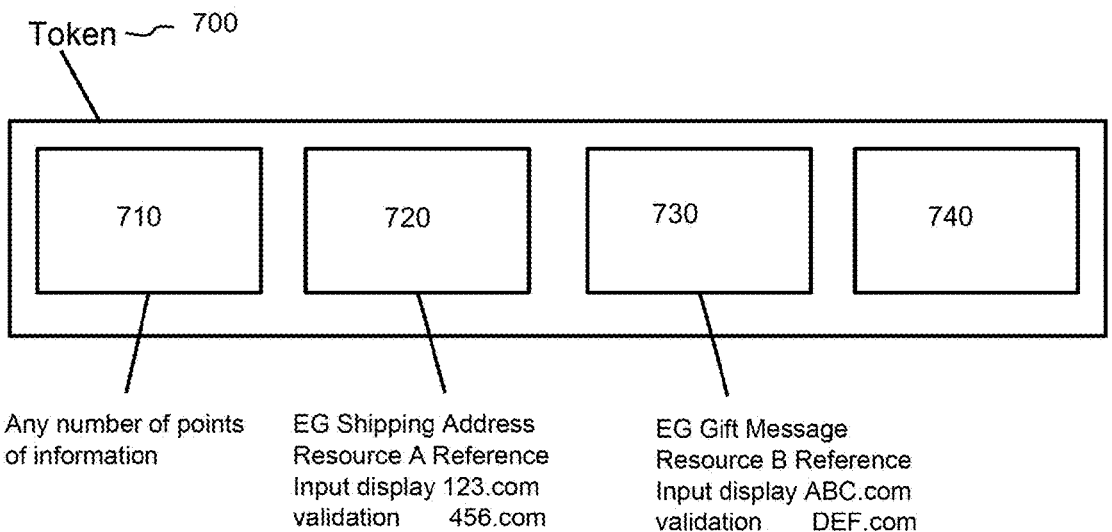
FIG. 7 is an illustration of the segmentation of information in the token.

FIG. 7 is an illustration of the segmentation of information in the token 700. The token 700 may include segments or portions of the token shown as segment 710, segment 720, segment 730 and segment 740. As shown in FIG. 7, the token 700 may include any number of distinct packets (e.g. types, portions or groups) of information in segment 710. The token 700 may include a shipping address and related information in segment 720, a gift message and related information in segment 730, and other related or needed information in segment 740. Other configurations of token 700 will be understood and the token 700 of FIG. 7 is provided as a single example of numerous configurations.

Figure 8:
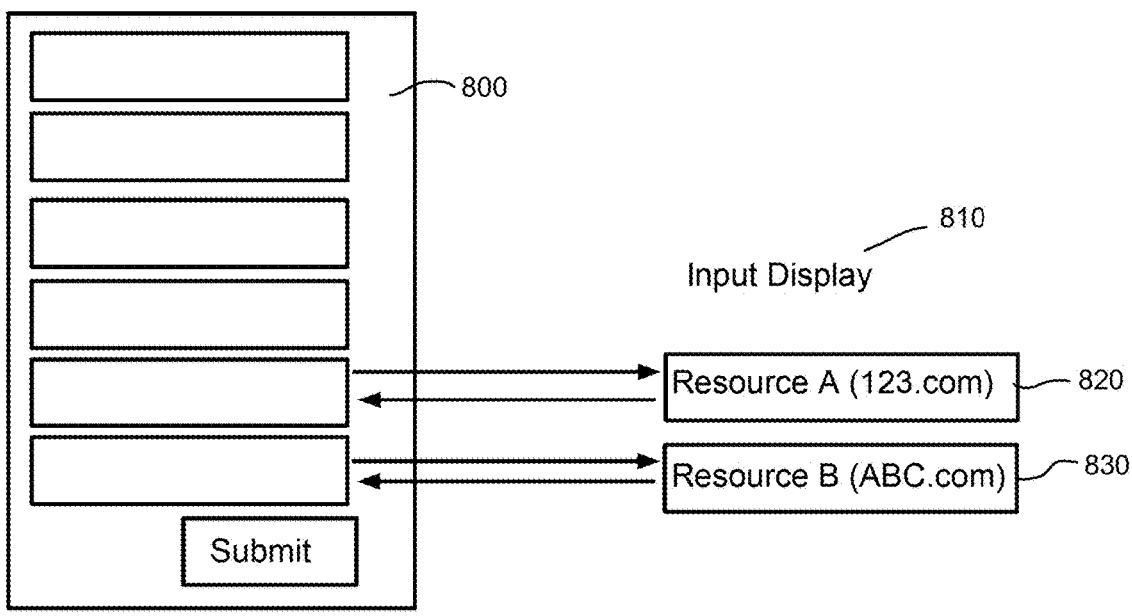
FIG. 8 illustrates a web checkout page with an input display using a token.

FIG. 8 illustrates a web checkout page 800 with an input display 810 using a token, such as token 700. As shown in FIG. 8, the web checkout page 800 may communicate with a first Resource (Resource A—123.com) 820 and a second resource (Resource B—ABC.com) 830 for the input display 810. Web checkout page 800 may include a submit button to activate the submission once the page 800 is appropriately populated.

Figure 9:
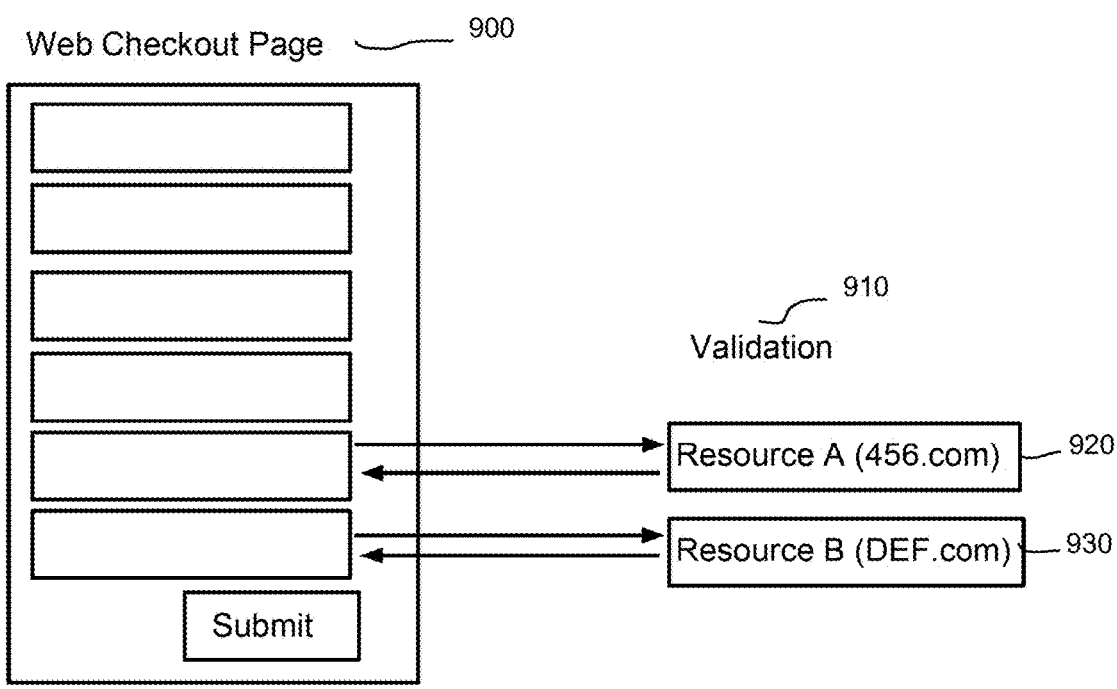
FIG. 9 illustrates web checkout page and validation using a token.

FIG. 9 illustrates web checkout page 900 and validation 910 using a token, such as token 700. As shown in FIG. 9, the web checkout page 900 may communicate with a third Resource (Resource A—456.com) 920 and a fourth Resource (Resource B—DEF.com) 930 for validation 910. The packets of information, such as segment 710 in token 700 corresponds to the resources in 820, 830, 920, 930 shown in FIGS. 8 and 9.

When an unregistered customer is driven to the page 800, 900, the token 700 provides the resources that constitute the page 800, 900. FIG. 8 shows the way the resource defines what inputs are displayed on the page 800. For example, resource A would describe the number of fields and their labels for the form to collect the shipping address.

FIG. 9 shows the resource that is then being called to validate the customer's entry in those fields. For example, resource A would confirm that only numbers were entered in the zip code field, if that was a requirement for the validation.

Figure 10:
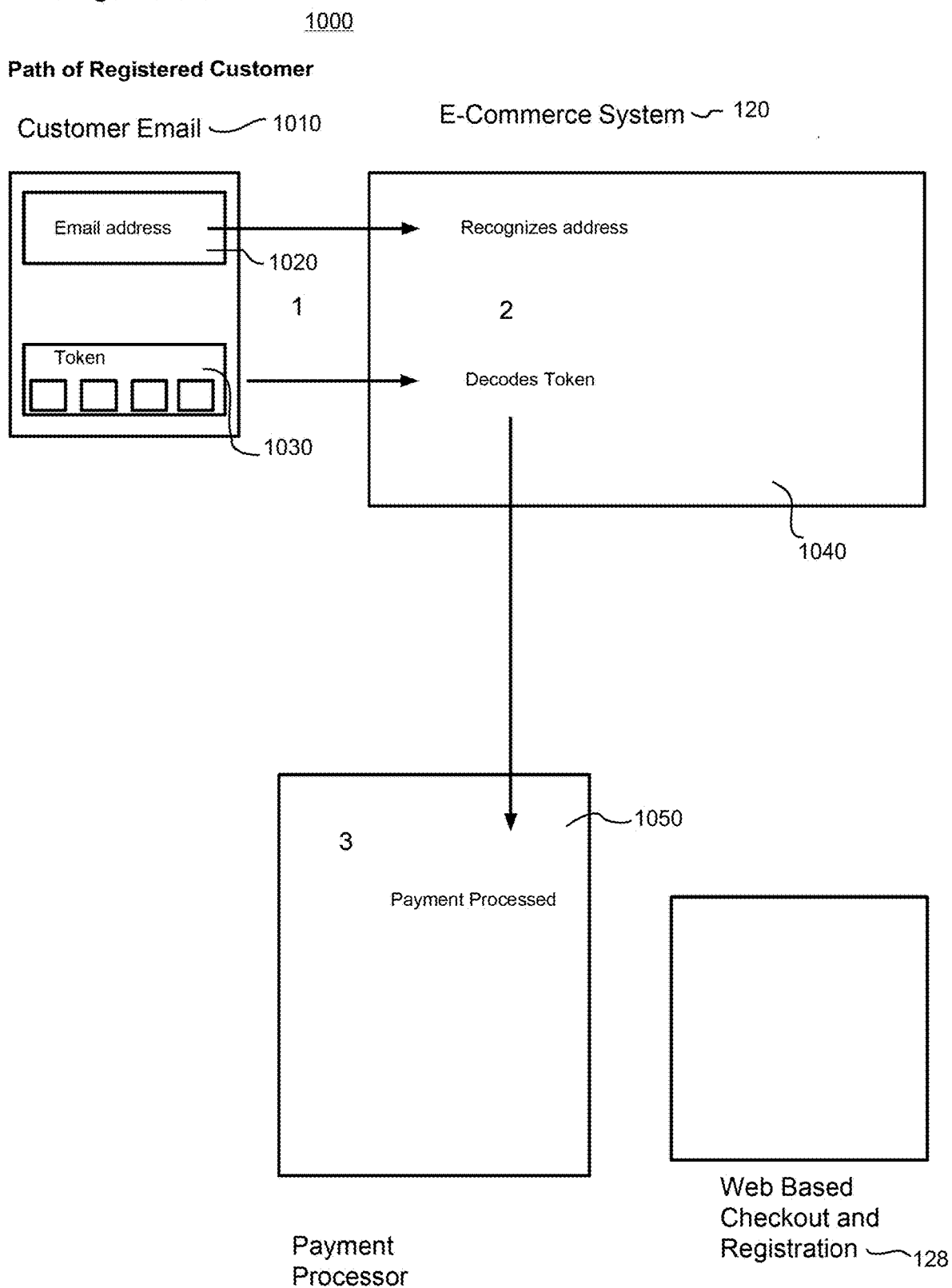
FIG. 10 shows an example data flow following the message of a registered customer in e-commerce system.

FIG. 10 shows an example data flow 1000 following the message of a registered customer in e-commerce system 120. Data flow 1000 represents email-based checkout. A customer email 1010, which may include an email address 1020 and a token 1030, may be sent to the e-commerce system 120. The e-commerce system 120 recognizes the address and then decodes the token at 1040. The payment is then processed at 1050 via the payment processor. The customer does not have to interact with the web-based checkout and registration 128.

Figure 11:
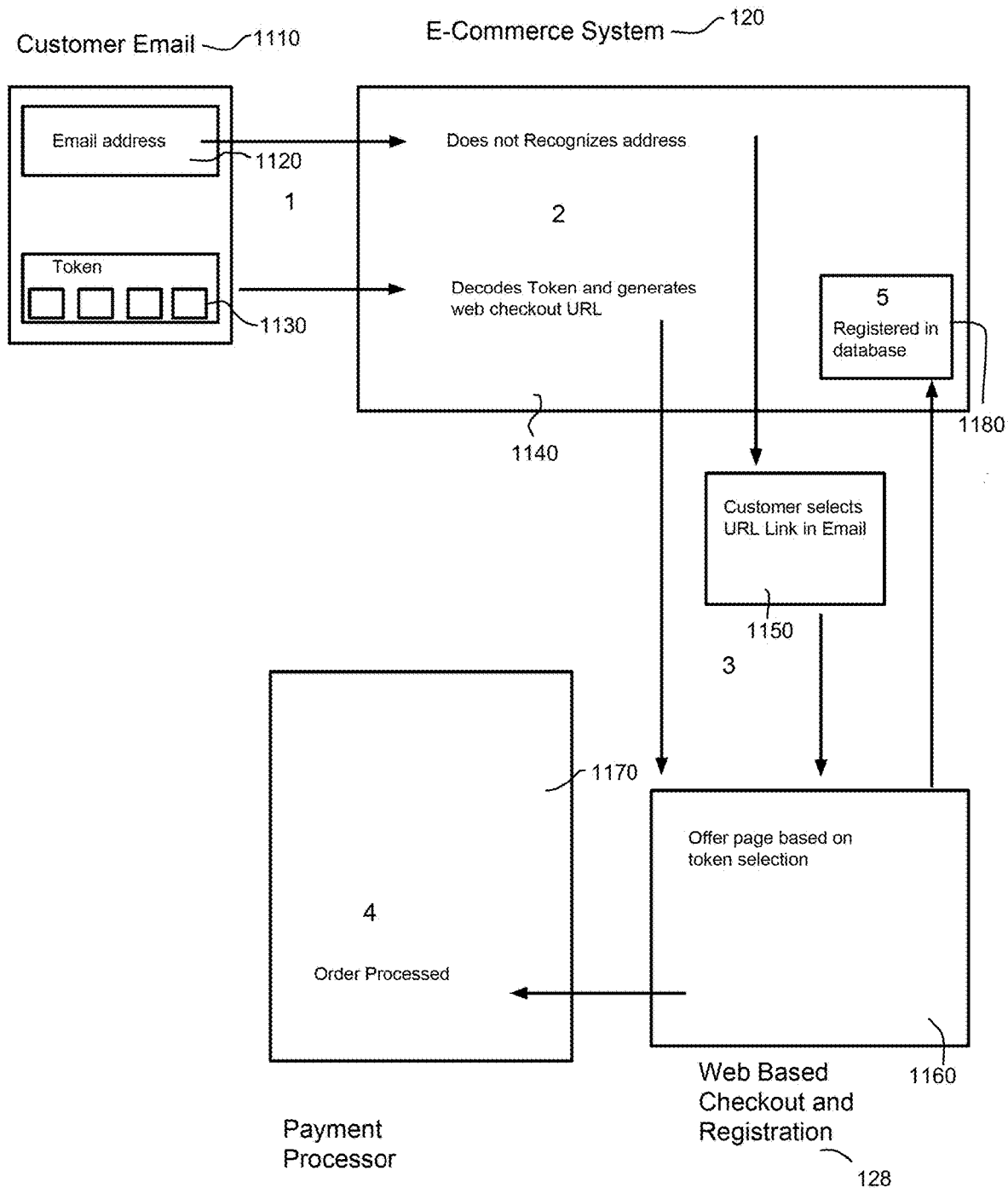
FIG. 11 shows an example data flow following the message of an unregistered customer in e-commerce system.

FIG. 11 shows an example data flow 1100 following the message of an unregistered customer in e-commerce system 120. Data flow 1100 represents web-based checkout and registry. As shown in FIG. 11, a customer email 1110, which may include an email address 1120 and a token 1130, may be set to the e-commerce system 120. The e-commerce system 120 does not recognize the address. The e-commerce system 120 decodes the token and generates a web checkout URL at 1140. The customer selects an URL link in the email 1150, which takes them to a web-based checkout and registration page 128. The customer is presented with an offer page based on the token at 1160. The customer may then enter information and the payment is processed 1170. The web-based checkout 128 information is communicated with the e-commerce system 120 which stores the information in a database and registers the customer for subsequent transactions at 1180.

Figure 12:
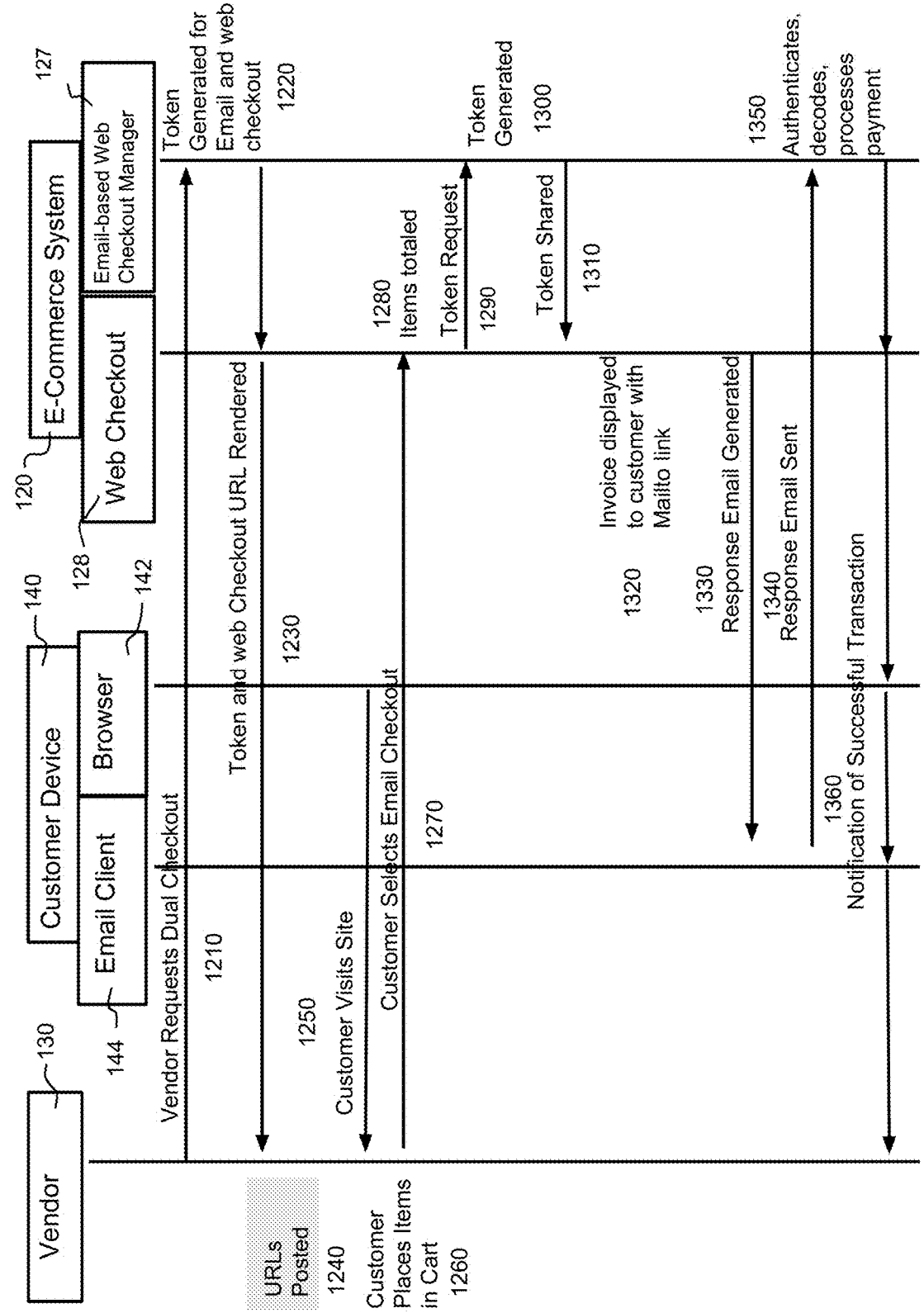
FIG. 12 illustrates a transaction using a dual checkout email-based web checkout for a registered customer.

FIG. 12 illustrates a transaction 1200 using a dual checkout email-based web checkout for a registered customer. The email transaction 1200 may be initiated by a vendor requesting dual checkout via vendor system 130 at step 1210. The e-commerce system 120 may utilize email-based web checkout manager 127, web checkout 128 and token generator 180 to generate a token for sharing and web checkout at step 1220. The e-commerce system 120 may share the token and web checkout URL to vendor system 130 at step 1230. The vendor system 130 may post the URL at step 1240. This posted URL may be visited by a customer at step 1250 and may be viewed on the browser 142 of customer device 140. The customer via customer device's 140 browser 142 may place items in the customer's cart at step 1260. This selection or associated activation of a checkout causes a response email to be sent from the vendor to the e-commerce system 120 at step 1270.

The e-commerce system 120 at web checkout 128 totals the items in the cart at step 1280. The total may include number of items, types of items, and total cost of the carted items, for example. Web checkout 128 may request a token from email-based web checkout manager 127 at step 1290. Email-based web checkout manager 127 may generate the token at step 1300. Email-based web checkout manager 127 may share the token with web checkout 128 at step 1310. The ecommerce system 120 may display an invoice to the customer with a mailto link at step 1320 and may generate a response email with the mailto link included at step 1330. The customer via customer device's 140 email client 144 selects the mailto link. This selection causes a response email to be sent from the customer device 140 to the e-commerce system 120 at step 1340. The e-commerce system 120 authenticates the email and decodes the token, determines customer is registered within ecommerce system 120 and processes the payment at step 1350. The transaction is completed when the e-commerce system 120 sends a notification of a successful transaction to customer device 140 and vendor system 130 at step 1360.

Figure 13:
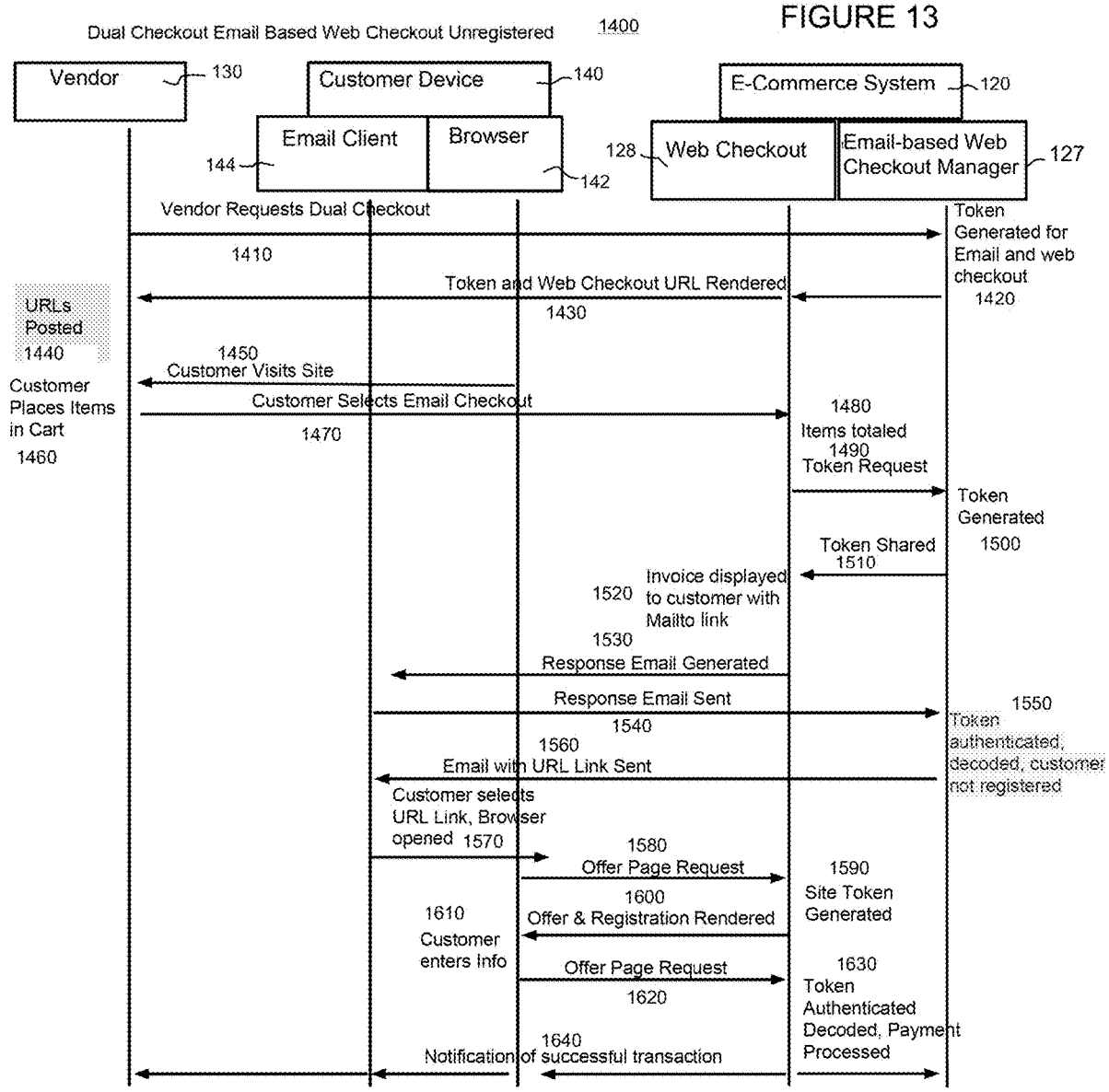
FIG. 13 illustrates a transaction using a dual checkout email-based web checkout for an unregistered customer.

FIG. 13 illustrates a transaction 1400 using a dual checkout email-based web checkout for an unregistered customer. The email transaction 1400 may be initiated by a vendor requesting dual checkout via vendor system 130 at step 1410. The e-commerce system 120 may utilize email-based web checkout manager 127, web checkout 128 and token generator 180 to generate a token for sharing and web checkout at step 1420. The e-commerce system 120 may share the token and web checkout URL to vendor system 130 at step 1430. The vendor system 130 may post the URL at step 1440. This posted URL may be visited by a customer at step 1450 and may be viewed on the browser 142 of customer device 140. The customer via customer device's 140 browser 142 may place items in the customer's cart at step 1460. This selection or associated activation of a checkout causes a response email to be sent from the vendor to the e-commerce system 120 at step 1470. The e-commerce system 120 at web checkout 128 totals the items in the cart at step 1480. The total may include number of items, types of items, and total cost of the carted items, for example. Web checkout 128 may request a token from email-based web checkout manager 127 at step 1490. Email-based web checkout manager 127 may generate the token at step 1500. Email-based web checkout manager 127 may share the token with web checkout 128 at step 1510. The ecommerce system 120 may display an invoice to the customer with a mailto link at step 1520 and may generate a response email with the mailto link included at step 1530. The customer via customer device's 140 email client 144 selects the mailto link. This selection causes a response email to be sent from the customer device 140 to the e-commerce system 120 at step 1540.

The e-commerce system 120 authenticates the email and decodes the token and the payment is processed at step 1550. Since the customer is unregistered with e-commerce system 120, the e-commerce system 120 sends an email with the URL link to customer through customer device 140 at step 1560. The customer accessing the email client 144 of customer device 140 selects the URL link to open a web browser 142 on customer device 140 at step 1570. The customer via web browser 142 makes an offer page request at step 1580. Responsive to the request, the e-commerce system 120 generates a site token at step 1590. The e-commerce system renders an offer and registration to customer device 140 at step 1600. The customer enters information at step 1610 via web browser 142. The offer page request is returned to e-commerce system 120 at step 1620. The e-commerce system 120 authenticates and decodes the token and processes the payment at step 1630. The transaction is completed when the e-commerce system 120 sends a notification of a successful transaction to customer device 140 and vendor system 130 at step 1640.

It should be understood that many variations are possible based on the disclosure herein. Although features and elements are described above in particular combinations, each feature or element may be used alone without the other features and elements or in various combinations with or without other features and elements.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method that utilizes Simple Mail Transfer Protocol (SMTP) to improve security in an e-commerce computer system, the method comprising:
    receiving, by a processor of the e-commerce computer system, a first email message that includes an encrypted token via SMTP, wherein the encrypted token includes transaction information for a transaction from a third party vendor and at least one key;
    authenticating, by the processor, the first email message based on a sender of the first email message; and
    on a condition that the sender is authenticated:
        decoding, by the processor, the encrypted token to form a decoded token using the at least one key,
        determining, by the processor, a customer email address and a registration status of a customer based on the decoded token, and
        performing, by the processor, the transaction based on the registration status determined.

2. The method of claim 1, further comprising:
    on a condition that the registration status of the customer indicates an unregistered customer:
    transmitting, by the processor, a second email message to the customer email address via SMTP, wherein the second email message includes a link to a web checkout, wherein the link to the web checkout.

3. The method of claim 2, wherein completion of the web checkout updates the registration status of the customer to a registered customer.

4. The method of claim 1, wherein the at least one key includes an Auth-key.

5. The method of claim 2, further comprising
    transmitting, by the processor, the web checkout to the customer in response to the customer activating the link.

6. The method of claim 2, wherein the link is based on the encrypted token.

7. The method of claim 1, wherein the first email message is authenticated using at least one of DomainKeys Identified Mail (DKIM) and Sender Policy Framework (SPF) protocols.

8. An e-commerce computer system that utilizes Simple Mail Transfer Protocol (SMTP) to improve security of the e-commerce computer system, the e-commerce computer system comprising:
    a communications interface that is communicatively coupled to a client device and a vendor system via a network;
    a processor communicatively that is communicatively coupled to the communication interface, wherein the processor:
    receives, using the communication interface, a first email message from the client device, wherein the first email message includes an encrypted token that includes transaction information for a transaction from the vendor system and at least one key,
    authenticates the first email message based on a sender of the first email message; and
    on a condition that the first email message is authenticated:
        decodes, using the at least one key, the encrypted token to form a decoded token,
        determines a customer email address and a registration status of a customer based on the decoded token, and
        performs the transaction based on the registration status determined.

9. The e-commerce computer system of claim 8, wherein the first email message is authenticated using at least one of DomainKeys Identified Mail (DKIM) and Sender Policy Framework (SPF) protocols.

10. The e-commerce computer system of claim 8, wherein the processor is further configured to
    on a condition that the registration status of the customer indicates an unregistered customer:
    transmitting, using the communication interface, a second email message to the customer email address via SMTP, wherein the second email message includes a link to a web checkout.

11. The e-commerce computer system of claim 8, wherein the at least one key includes an Auth-key.

12. The e-commerce computer system of claim 10, wherein completion of the web checkout updates the registration status of the customer to a registered customer.

13. The e-commerce computer system of claim 10, wherein the link is generated based on the encryption token.

14. A non-transitory computer-readable medium having processor-executable instructions stored thereon which, when executed by a processor of an e-commerce computer system, causes the processor to perform a method for improving security of an e-commerce network by using Simple Mail Transfer Protocol (SMTP), the method comprising:
  receiving, by the processor, a first email message that includes an encrypted token via SMTP, wherein the encrypted token includes transaction information for a transaction from a third party vendor and at least one key;
  authenticating, by the processor, the first email message based on a sender of the first email message; and
  on a condition that the sender is authenticated:
    decoding, by the processor, the encrypted token to form a decoded token using the at least one key,
    determining, by the processor, a customer email address and a registration status of a customer based on the decoded token, and
    performing, by the processor, the transaction based on the registration status determined.

15. The non-transitory computer-readable medium of claim 14 wherein the method further comprises:
  on a condition that the registration status of the customer indicates an unregistered customer:
    transmitting, by the processor, a second email message to the customer email address via SMTP, wherein the second email message includes a link to a web checkout, wherein the link to the web checkout.

16. The non-transitory computer-readable medium of claim 15, wherein completion of the web checkout updates the registration status of the customer to a registered customer.

17. The non-transitory computer-readable of claim 14, wherein the at least one key includes an Auth-key.

18. The non-transitory computer-readable medium of claim 15, the method further comprising
  transmitting, by the processor, the web checkout to the customer in response to the customer activating the link.

19. The non-transitory computer-readable medium of claim 15, wherein the link is based on the encrypted token.

20. The non-transitory computer-readable of claim 14, wherein the first email message is authenticated using at least one of DomainKeys Identified Mail (DKIM) and Sender Policy Framework (SPF) protocols.

* * * * *